(12) United States Patent
Doyen et al.

(10) Patent No.: US 11,962,745 B2
(45) Date of Patent: Apr. 16, 2024

(54) METHOD AND APPARATUS FOR PROCESSING IMAGE CONTENT

(71) Applicant: INTERDIGITAL CE PATENT HOLDINGS, SAS, Paris (FR)

(72) Inventors: Didier Doyen, Cesson-Sevigne (FR); Franck Galpin, Thorigne-Fouillard (FR); Guillaume Boisson, Pleumeleuc (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 119 days.

(21) Appl. No.: 17/763,757

(22) PCT Filed: Sep. 29, 2020

(86) PCT No.: PCT/EP2020/077179
§ 371 (c)(1),
(2) Date: Mar. 25, 2022

(87) PCT Pub. No.: WO2021/063919
PCT Pub. Date: Apr. 8, 2021

(65) Prior Publication Data
US 2022/0311986 A1    Sep. 29, 2022

(30) Foreign Application Priority Data
Sep. 30, 2019    (EP) .................................... 19306245

(51) Int. Cl.
*H04N 13/178*    (2018.01)
*G06T 7/593*    (2017.01)
(Continued)

(52) U.S. Cl.
CPC ........... *H04N 13/178* (2018.05); *G06T 7/596* (2017.01); *H04N 13/194* (2018.05);
(Continued)

(58) Field of Classification Search
CPC .. H04N 13/178; H04N 19/513; H04N 19/597; H04N 13/271; H04N 13/194;
(Continued)

(56) References Cited

U.S. PATENT DOCUMENTS

2022/0084300 A1\* 3/2022 Izumi ...................... G06T 15/04

FOREIGN PATENT DOCUMENTS

WO    WO 2010037512 A1    4/2010

OTHER PUBLICATIONS

Zhang et al., "A Flexible New Technique for Camera Calibration", Institute for Electronics and Electrical Engineers (IEEE), IEEE Transactions on Pattern Analysis & Machine Intelligence, vol. 22, No. 11, Nov. 2000, 5 pages.
(Continued)

*Primary Examiner* — Kyle M Lotfi
(74) *Attorney, Agent, or Firm* — CONDO ROCCIA KOPTIW LLP

(57) ABSTRACT

A method and system are provided for processing image content. The method comprises receiving information about a content image captured at least by one camera. The content includes multi-view representation of an image including both distorted and undistorted areas. The camera parameters and image parameters are then obtained and used to determine to which areas are undistorted and which areas are distorted in said image. This is used to calculate depth map of the image using the determined undistorted and distorted information. A final stereoscopic image is then rendered that uses the distorted and undistorted areas and calculation of depth map.

20 Claims, 22 Drawing Sheets

Camera array with 16 cameras

(51) Int. Cl.
  *H04N 13/194* (2018.01)
  *H04N 13/243* (2018.01)
  *H04N 13/271* (2018.01)
  *H04N 13/282* (2018.01)
  *H04N 19/513* (2014.01)
  *H04N 19/597* (2014.01)
  *H04N 19/70* (2014.01)

(52) U.S. Cl.
  CPC ......... *H04N 13/243* (2018.05); *H04N 13/271* (2018.05); *H04N 13/282* (2018.05); *H04N 19/513* (2014.11); *H04N 19/597* (2014.11); *H04N 19/70* (2014.11)

(58) Field of Classification Search
  CPC .... H04N 13/243; H04N 13/282; H04N 19/70; G06T 7/596
  See application file for complete search history.

(56) References Cited

OTHER PUBLICATIONS

Yea et al., "View Synthesis Prediction for Multiview Video Coding", Elsevier; Signal Processing: Image Communication, vol. 24, Mitsubishi Electric Research Laboratories, Cambridge, Massachusetts, USA, Oct. 19, 2008, 14 pages.

Anonymous, "High Efficiency Video Coding", International Telecommunication Union, Telecommunication Standardization Sector of ITU, Series H: Audiovisual and Multimedia Systems—Infrastructure of audiovisual services—Coding of moving video, Recommendation of ITU-T H.265, Nov. 2019, 712 pages.

Bouguet, Jean-Yves, "Camera Calibration Toolbox for Matlab", URL: http://www.vision.caltech.edu/bouguetj/calib_doc, last updated Oct. 14, 2015, 4 pages.

* cited by examiner

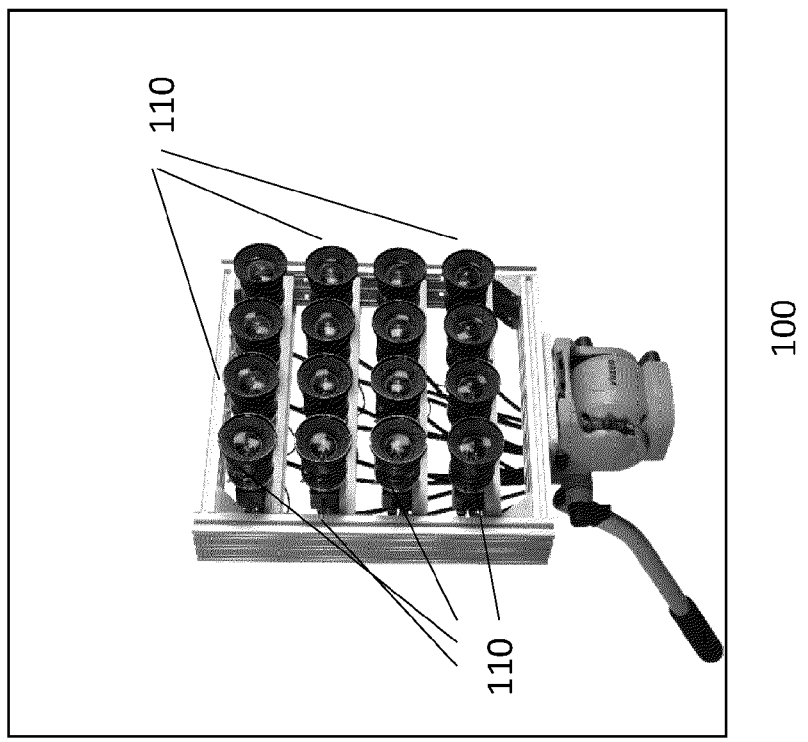
Figure 1: Camera array with 16 cameras

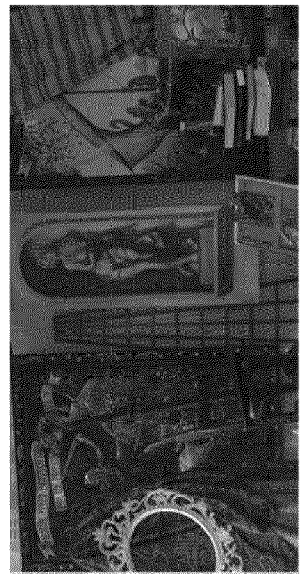
Figure 2a
Figure 2b:
One view and its associated depth map

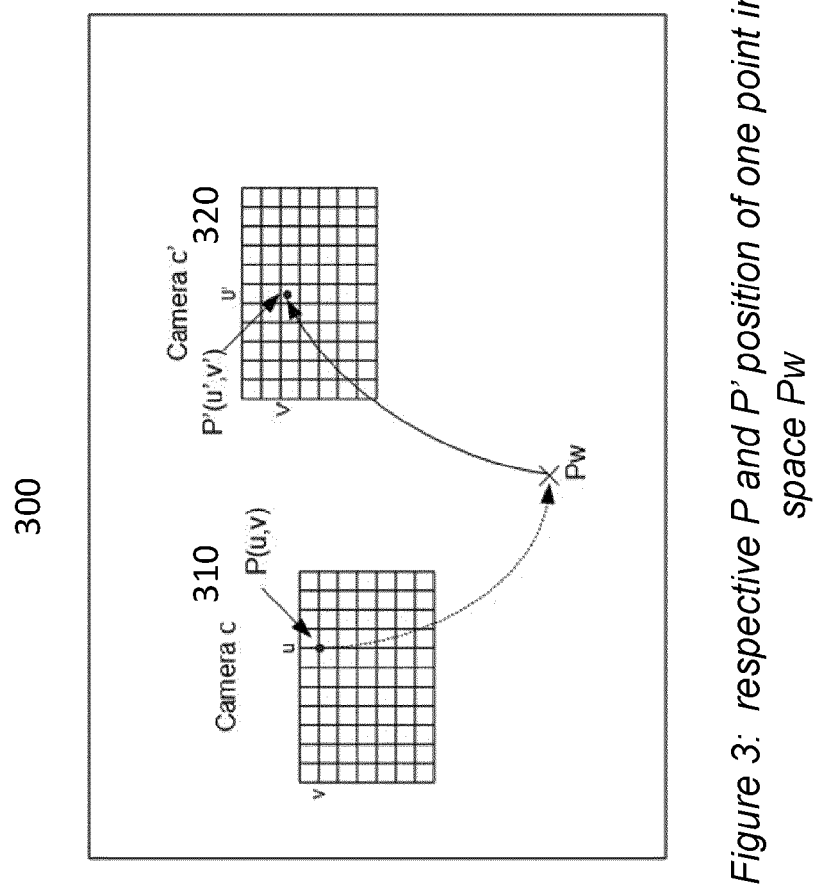
Figure 3: respective P and P' position of one point in space Pw

| | Descriptor |
|---|---|
| multiview_acquisition_info( payloadSize ) { | |
| intrinsic_param_flag | u(1) |
| extrinsic_param_flag | u(1) |
| if( intrinsic_param_flag ) { | |
| intrinsic_params_equal_flag | u(1) |
| prec_focal_length | ue(v) |
| prec_principal_point | ue(v) |
| prec_skew_factor | ue(v) |
| for( i = 0; i <= intrinsic_params_equal_flag ? 0 : numViewsMinus1; i++ ) { | |
| sign_focal_length_x[ i ] | u(1) |
| exponent_focal_length_x[ i ] | u(6) |
| mantissa_focal_length_x[ i ] | u(v) |
| sign_focal_length_y[ i ] | u(1) |
| exponent_focal_length_y[ i ] | u(6) |
| mantissa_focal_length_y[ i ] | u(v) |
| sign_principal_point_x[ i ] | u(1) |
| exponent_principal_point_x[ i ] | u(6) |
| mantissa_principal_point_x[ i ] | u(v) |
| sign_principal_point_y[ i ] | u(1) |
| exponent_principal_point_y[ i ] | u(6) |
| mantissa_principal_point_y[ i ] | u(v) |
| sign_skew_factor[ i ] | u(1) |
| exponent_skew_factor[ i ] | u(6) |
| mantissa_skew_factor[ i ] | u(v) |

Figure 8

| | |
|---|---|
| A----------------------------------------------A' | |
| } | |
| } | |
| if( extrinsic_param_flag ) { | |
|   prec_rotation_param | ue(v) |
|   prec_translation_param | ue(v) |
|   for( i = 0; i <= numViewsMinus1; i++) | |
|     for( j = 1; j <= 3; j++) { /* row */ | |
|       for( k = 1; k <= 3; k++) { /* column */ | |
|         sign_r[ i ][ j ][ k ] | u(1) |
|         exponent_r[ i ][ j ][ k ] | u(6) |
|         mantissa_r[ i ][ j ][ k ] | u(v) |
|       } | |
|       sign_t[ i ][ j ] | u(1) |
|       exponent_t[ i ][ j ] | u(6) |
|       mantissa_t[ i ][ j ] | u(v) |
|     } | |
|   } | |
| } | |

Figure 8 (Continued)

| multiview_acquisition_info( payloadSize ) { | Descriptor |
|---|---|
| Two-by-two_camera_parameters_flag | u(1) |
| if(Two-by-two_camera_parameters_flag) { | |
| Number_of_camera_pairs | u(16) |
| for( i = 0; i <= Number_of_camera_pairs; i++ ) { | |
| for( j = 1; j <= 3; j++ ) { /* row */ | |
| for( k = 1; k <= 3; k++ ) { /* column */ | |
| Acc'_sign_t [ i ][ j ][ k ] | u(1) |
| Acc'_exponent_t [ i ][ j ][ k ] | u(6) |
| Acc'_mantissa_t [ i ][ j ][ k ] | u(v) |
| } | |
| Bcc'_sign_t[ i ][ j ] | u(1) |
| Bcc'_exponent_t[ i ][ j ] | u(6) |
| Bcc'_mantissa_t[ i ][ j ] | u(v) |
| } | |
| } | |

Figure 9

| multiview_acquisition_info( payloadSize ) { | Descriptor |
|---|---|
| Two-by-two_camera_parameters_flag | u(1) |
| if(Two-by-two_camera_parameters_flag) { | |
| Number_of_camera_pairs | u(16) |
| for( i = 0; i <= Number_of_camera_pairs; i++ ) { | |
| for( j = 1; j <= 3; j++ ) { /* row */ | |
| for( k =1; k <= 3; k++ ) { /* column */ | |
| Acc' [ i ][ j ][ k ] | u(32) |
| } | |
| Bcc' [ i ][ j ] | u(32) |
| } | |
| } | |

Figure 10

| multiview_acquisition_distortion_info( payloadSize ) { | Descriptor |
|---|---|
| Distortion_parameters_flag | u(1) |
| if(Distortion_parameters_flag) { | |
| Type_of_model | u(8) |
| | |
| for( i = 0; i <= numViewsMinus1; i++ ) | |
| for( j = 0; j <= Number_of_parameters(type_of_model); j++ ) { | |
| W_ sign_t [ i ] [ j ] | u(1) |
| W _exponent_t [ i ] [ j ] | u(6) |
| W _ mantissa_t [ i ] [ j ] | u(v) |
| $W^{-1}$_ sign_t [ i ] [ j ] | u(1) |
| $W^{-1}$_exponent_t [ i ] [ j ] | u(6) |
| $W^{-1}$_ mantissa_t [ i ] [ j ] | u(v) |
| } | |
| } | |
| } | |

Figure 11

| | Descriptor |
|---|---|
| multiview_acquisition_info( payloadSize ) { | |
| Two-by-two_camera_parameters_flag | u(1) |
| if(Two-by-two_camera_parameters_flag) { | |
| Number_of_camera_pairs | u(16) |
| for( i = 0; i <= Number_of_camera_pairs; i++ ) { | |
| for( j = 1; j <= 3; j++ ) { /* row */ | |
| for( k = 1; k <= 3; k++ ) { /* column */ | |
| Acc'_sign_t [ i ][ j ][ k ] | u(1) |
| Acc'_exponent_t [ i ][ j ][ k ] | u(6) |
| Acc'_mantissa_t [ i ][ j ][ k ] | u(v) |
| } | |
| Bcc'_sign_t[ i ][ j ] | u(1) |
| Bcc'_exponent_t[ i ][ j ] | u(6) |
| Bcc'_mantissa_t[ i ][ j ] | u(v) |
| } | |
| } | |
| Distortion_parameters_flag | u(1) |
| if(Distortion_parameters_flag) { | |
| Distortion_model | u(8) |
| Number_of_parameters_in_current_model | u(8) |
| for( i = 0; i <= numViewsMinus1; i++ ) | |
| for( j = 0; j <= Number_of_parameters_in_current_model; j++ ) { | u(1) |
| W_sign_t [ i ] [ j ] | u(6) |
| W_exponent_t [ i ] [ j ] | u(v) |
| W_mantissa_t [ i ] [ j ] | u(1) |
| $W^{-1}$_sign_t [ i ] [ j ] | u(6) |
| $W^{-1}$_exponent_t [ i ] [ j ] | u(v) |

Figure 12

| | |
|---|---|
| } | |
| } | |
| intrinsic_param_flag | u(1) |
| if( intrinsic_param_flag ) { | |
| intrinsic_params_equal_flag | u(1) |
| prec_focal_length | ue(v) |
| prec_principal_point | ue(v) |
| prec_skew_factor | ue(v) |
| for( i = 0; i <= intrinsic_params_equal_flag ? 0 : numViewsMinus1;i++) { | |
| sign_focal_length_x[ i ] | u(1) |
| exponent_focal_length_x[ i ] | u(6) |
| mantissa_focal_length_x[ i ] | u(v) |
| sign_focal_length_y[ i ] | u(1) |
| exponent_focal_length_y[ i ] | u(6) |
| mantissa_focal_length_y[ i ] | u(v) |
| sign_principal_point_x[ i ] | u(1) |
| exponent_principal_point_x[ i ] | u(6) |
| mantissa_principal_point_x[ i ] | u(v) |
| sign_principal_point_y[ i ] | u(1) |
| exponent_principal_point_y[ i ] | u(6) |
| mantissa_principal_point_y[ i ] | u(v) |
| sign_skew_factor[ i ] | u(1) |
| exponent_skew_factor[ i ] | u(6) |
| mantissa_skew_factor[ i ] | u(v) |
| } | |
| } | |
| } | |

Figure 12 (Continued)

| | Descriptor |
|---|---|
| multiview_acquisition_info( payloadSize ) { | |
| Two-by-two_camera_parameters_flag | u(1) |
| if(Two-by-two_camera_parameters_flag) { | |
| Number_of_camera_pairs | u(16) |
| for( i = 0; i <= Number_of_camera_pairs; i++ ) { | |
|   for( j = 1; j <= 3; j++ ) { /* row */ | |
|   for( k = 1; k <= 3; k++ ) { /* column */ | |
|     Acc'_sign_t [ i ][ j ][ k ] | u(1) |
|     Acc'_exponent_t [ i ][ j ][ k ] | u(6) |
|     Acc'_mantissa_t [ i ][ j ][ k ] | u(v) |
|   } | |
|   Bcc'_sign_t [ i ][ j ] | u(1) |
|   Bcc'_exponent_t [ i ][ j ] | u(6) |
|   Bcc'_mantissa_t [ i ][ j ] | u(v) |
|   } | |
| } | |
| Distortion_parameters_flag | u(1) |
| if(Distortion_parameters_flag) { | |
| Type_of_model | u(8) |
| Number_of_parameters_in_current_model | u(8) |
| for( i = 0; i <= numViewsMinus1; i++ ) | |
| for( j = 0; j <= Number_of_parameters_in_current_model; j++ ) { | u(1) |
|   W_sign_t [ i ] [ j ] | u(6) |
|   W_exponent_t [ i ] [ j ] | u(v) |
|   W_mantissa_t [ i ] [ j ] | u(1) |
|   } | |
| } | |
| Undistortion_map_flag | u(1) |
| if(Undistortion_map_flag) { | |

| | |
|---|---|
| Subsampling_factor_X | u(16) |
| Subsampling_factor_Y | u(16) |
| for( k= 0; k<= numViewsMinus1; k++ ) { | |
| for( i = 0; i <= Number_pixel_X/ Subsampling_factor_X; i++ ) { | |
| for( j = 0; j <= Number_pixel_Y/ Subsampling_factor_Y; j++ ) { | |
|    Undistortion_map_sign_t [ i ][ j ][ k ] | u(1) |
|    Undistortion_map_exponent_t [ i ][ j ][ k ] | u(6) |
|    Undistortion_map_mantissa_t [ i ][ j ][ k ] | u(v) |
|    } | |
|   } | |
| } | |
| intrinsic_param_flag | u(1) |
| if( instrinsic_param_flag ) { | |
| intrinsic_params_equal_flag | u(1) |
| prec_focal_length | ue(v) |
| prec_principal_point | ue(v) |
| prec_skew_factor | ue(v) |
| for( i = 0; i <= intrinsic_params_equal_flag ? 0 : numViewsMinus1; i++ ) { | |
| sign_focal_length_x[ i ] | u(1) |
| exponent_focal_length_x[ i ] | u(6) |
| mantissa_focal_length_x[ i ] | u(v) |
| sign_focal_length_y[ i ] | u(1) |
| exponent_focal_length_y[ i ] | u(6) |
| mantissa_focal_length_y[ i ] | u(v) |
| sign_principal_point_x[ i ] | u(1) |
| exponent_principal_point_x[ i ] | u(6) |
| mantissa_principal_point_x[ i ] | u(v) |
| sign_principal_point_y[ i ] 1 | u(1) |

| | |
|---|---|
| multiview_acquisition_info( payloadSize ) { | Descriptor |
| Two-by-two_camera_parameters_flag | u(1) |
| if(Two-by-two_camera_parameters_flag) { | |
| Number_of_camera_pairs | u(16) |
| for( i = 0; i <= Number_of_camera_pairs; i++ ) { | |
| for( j = 1; j <= 3; j++ ) { /* row */ | |
| for( k = 1; k <= 3; k++ ) { /* column */ | |
| Acc'_sign_t [ i ][ j ][ k ] | u(1) |
| Acc'_exponent_t [ i ][ j ][ k ] | u(6) |
| Acc'_mantissa_t [ i ][ j ][ k ] | u(v) |
| } | |
| Bcc'_sign_t [ i ][ j ] | u(1) |
| Bcc'_exponent_t [ i ][ j ] | u(6) |
| Bcc'_mantissa_t [ i ][ j ] | u(v) |
| } | |
| } | |
| Distortion_parameters_flag | u(1) |
| if(Distortion_parameters_flag) { | |
| Type_of_model | u(8) |
| Number_of_parameters_in_current_model | u(8) |
| for( i = 0; i <= numViewsMinus1; i++) | |
| for( j = 0; j <= Number_of_parameters_in_current_model; j++) { | u(1) |
| W_sign_t [ i ] [ j ] | u(6) |
| W_exponent_t [ i ] [ j ] | u(v) |
| W_mantissa_t [ i ] [ j ] | u(1) |
| } | |
| } | |

| | |
|---|---|
| Ⓐ---------------------------------------------------- Ⓐ' | |
| Undistortion_map_flag | u(1) |
| if(Undistortion_map_flag) { | |
| Size_of_undistortionmap_X | u(16) |
| Size_of_undistortionmap_Y | u(16) |
| for( k= 0; k<= numViewsMinus1; k++ ) { | |
| for( i = 0; i <= Number_pixel_X/ Subsampling_factor_X; i++ ) { | |
| for( j = 0; j <= Number_pixel_Y/ Subsampling_factor_Y; j++ ) { | |
|     Undistortion_map_sign_t [ i ][ j ][ k ] | u(1) |
|     Undistortion_map_exponent_t [ i ][ j ][ k ] | u(6) |
|     Undistortion_map_mantissa_t [ i ][ j ][ k ] | u(v) |
|   } | |
|  } | |
| } | |
| intrinsic_param_flag | u(1) |
| if( instrinsic_param_flag ) { | |
| intrinsic_params_equal_flag | u(1) |
| prec_focal_length | ue(v) |
| prec_principal_point | ue(v) |
| prec_skew_factor | ue(v) |
| for( i = 0; i <= intrinsic_params_equal_flag ? 0 : numViewsMinus1; i++ ) { | |
| sign_focal_length_x[ i ] | u(1) |
| exponent_focal_length_x[ i ] | u(6) |
| mantissa_focal_length_x[ i ] | u(v) |
| sign_focal_length_y[ i ] | u(1) |
| Ⓑ---------------------------------------------------- Ⓑ' | |

Figure 14 (Continued)

| | |
|---|---|
| B ---------------------------------------- B' | |
| exponent_focal_length_y[ i ] | u(6) |
| mantissa_focal_length_y[ i ] | u(v) |
| sign_principal_point_x[ i ] | u(1) |
| exponent_principal_point_x[ i ] | u(6) |
| mantissa_principal_point_x[ i ] | u(v) |
| sign_principal_point_y[ i ] | u(1) |
| exponent_principal_point_y[ i ] | u(6) |
| mantissa_principal_point_y[ i ] | u(v) |
| sign_skew_factor[ i ] | u(1) |
| exponent_skew_factor[ i ] | u(6) |
| mantissa_skew_factor[ i ] | u(v) |
| } | |
| } | |
| } | |

Figure 14 (Continued)

| | Descriptor |
|---|---|
| multiview_acquisition_info( payloadSize ) { | |
| Two-by-two_camera_parameters_flag | u(1) |
| if(Two-by-two_camera_parameters) { | |
| Number_of_camera_pairs | u(16) |
| for( i = 0; i <= Number_of_camera_pairs; i++ ) { | |
| for( j = 1; j <= 3; j++ ) { /* row */ | |
| for( k = 1; k <= 3; k++ ) { /* column */ | |
| Acc'_sign_t [ i ][ j ][ k ] | u(1) |
| Acc'_exponent_t [ i ][ j ][ k ] | u(6) |
| Acc'_mantissa_t [ i ][ j ][ k ] | u(v) |
| } | |
| Bcc'_sign_t [ i ][ j ] | u(1) |
| Bcc'_exponent_t [ i ][ j ] | u(6) |
| Bcc'_mantissa_t [ i ][ j ] | u(v) |
| } | |
| } | |
| Undistortion_map_flag | u(1) |
| if(Undistortion_map_flag) { | |
| Subsampling_factor_X | u(16) |
| Subsampling_factor_Y | u(16) |
| for( k= 0; k<= numViewsMinus1; k++ ) { | |
| for( i = 0; i <= Number_pixel_X/ Subsampling_factor_X; i++ ) { | |
| for( j = 0; j <= Number_pixel_Y/ Subsampling_factor_Y; j++ ) { | |
| Undistortion_map_sign_t [ i ][ j ][ k ] | u(1) |
| Undistortion_map_exponent_t [ i ][ j ][ k ] | u(6) |
| Undistortion_map_mantissa_t [ i ][ j ][ k ] | u(v) |

METHOD AND APPARATUS FOR PROCESSING IMAGE CONTENT

CROSS REFERENCE TO RELATED APPLICATIONS

This application is a U.S. National Stage Application under 35 U.S.C. 371 of International Patent Application No. PCT/EP2020/077179, filed Sep. 29, 2020, which is incorporated herein by reference in its entirety.

This application claims the benefit of European Patent Application No. 1930,6245.2, filed Sep. 30, 2019, which is incorporated herein by reference in its entirety.

TECHNICAL FIELD

The present embodiments relate generally to image processing and more particularly to using depth-maps in captured images using transmitted camera parameters.

BACKGROUND

Conventional cameras capture light from a three-dimensional scene on a two-dimensional sensor device sensitive to visible light. Light sensitive technology used in such imaging devices is often based on semiconductor technology, capable of converting photons into electrons such as, for example, charge coupled devices (CCD) or complementary metal oxide technology (CMOS). A digital image photosensor, for example, typically includes an array of photosensitive cells, each cell being configured to capture incoming light. A 2D image providing spatial information is obtained from a measurement of the total amount of light captured by each photosensitive cell of the image sensor device. While the 2D image can provide information on the intensity of the light and the color of the light at spatial points of the photosensor(s), no information is provided on the direction of the incoming light.

Generating 3D or 4D renderings from 2D captured images is complex as visual perceptions has to be created after the fact. Two important considerations in creating accurate visual perceptions have to do with parallax estimation and depth map calculations. A depth map is an image or image channel that contains information relating to the distance of the surfaces of scene objects from a viewpoint. In other words, depth-maps are special images where each pixel records the distance (or the inverse of the distance, or any information which is function of the distance,) of the objects being observed at that position versus a camera. A depth-map may be computed, for example, using several cameras observing the same field-of-view and deducing depth with the variation of parallaxes between views. In practice, estimated depth-maps shows spurious pixels. Many reasons make depth-map estimation difficult. Some of these difficulties can include objects being partially masked from one camera to the next; variation of reflected light from an object observed at different position; surfaces with no or few textures making parallax estimation difficult; and sensitivity variation among cameras.

Parallax estimation and concept is important in visual perception and can be defined as a displacement or difference in the apparent position of an object viewed along two different lines of sight and it measured by the angle of inclination between those two lines. Each human eye has a slightly different visual line that is both different and overlapping. This concept allows for depth perception to be achieved. Parallax also affects optical instruments that view objects from slightly different angles.

In videos and streaming content, providing stereoscopic visual perception becomes even more complicated. Sometimes multiple views of the same scene image captured at different angles are provided to create appropriate parallax and depth map. However, storage and processing become challenging because related data is extensive. For example, to provide motion parallax, data relating to a multi-view content is needed. The information relating to the content must be dense enough to provide enough overlap between views but with different viewing angle to allow the effect to be provided. This is one key element any compression algorithm must exploit and address so as to reduce the amount of data to be transmitted (which needs to also take into account respective camera parameters). Unfortunately, prior art currently does not provide easy and practical techniques in this arena. Consequently, it is desirous to provide techniques that require less data to be captured and used to provide three and four dimensional visual perspectives.

SUMMARY

A method and system are provided for processing image content. The method comprises receiving information about a content image captured at least by one camera. The content includes multi-view representation of an image including both distorted and undistorted areas. The camera parameters and image parameters are then obtained and used to determine to which areas are undistorted and which areas are distorted in said image. This is used to calculate depth map of the image using the determined undistorted and distorted information. A final stereoscopic image is then rendered that uses the distorted and undistorted areas and calculation of depth map.

BRIEF DESCRIPTION OF THE DRAWINGS

Different embodiments of will now be described, by way of example only, and with reference to the following drawings in which:

FIG. 1 is a schematic diagram of providing a multi view camera according to an embodiment;

FIGS. 2*a* and 2*b*, are illustrations of a scene with its associated depth map according to one embodiment;

FIG. 3 is an illustration according to one embodiment where one pixel of one view is associated camera position;

FIG. 8 is an illustration of a table providing multi-view acquisition information;

FIG. 9 is a table illustration of the scientific calculations for an according to one embodiment having a two-by-two camera parameters;

FIG. 10 is a table illustration representing matrix in scientific representation;

FIG. 11 provides a table according to one embodiment having distortion parameters in scientific representation format;

FIG. 12 is another illustration of a table containing distortion parameters;

FIG. 14 is an illustration of yet another table having undistortion warp map parameters for an embodiment having a two-by-two camera. array.

DETAILED DESCRIPTION

Figure 4:
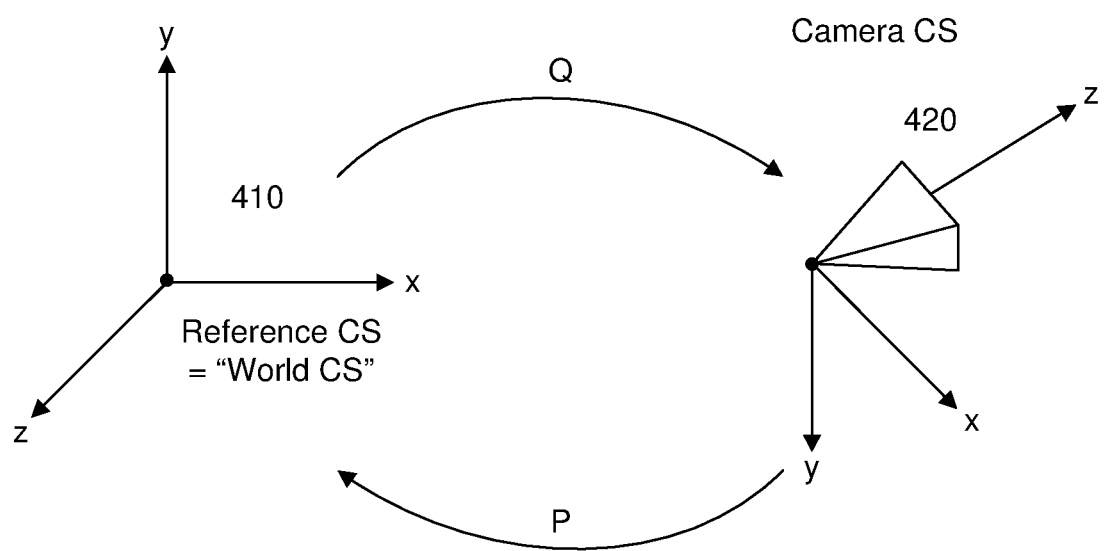
FIG. 4 illustrates a camera coordinate system according to one embodiment.

Most image captures provide two dimensional images. To create a three or four dimensional renderings of these images, different techniques can be used. For example, two or more views of the scene can be used for its reconstruction using a stereo pair of calibrated or uncalibrated cameras or through multiple images using a single camera or by capturing the same image through different angles such as when using a light field/plenoptic camera.

To enable the recreation of multi-dimensional visual perceptions, multi-view content transmitted needs to include pertinent information such as depth information to be effective. When more than one camera or angle is used, depth maps for each camera is needed with a well-defined MVD or Multi-View and Depth format. This information is often transmitted as the input in a format that used for the extension of technologies such in High Efficiency Video Coding (HEVC) standard for video compression/decompression.

As discussed, to provide motion parallax, a multi-view content must be dense enough to provide enough overlap between views but with different viewing angle to allow the effect but since this requires a lot of captured information compression algorithm becomes important in reducing the amount of data to be transmitted. In former 3D-HEVC and MV-HEVC extension of HEVC codec inter-view predictions were introduced. At that time multi-view camera systems were mostly considered as horizontal only systems and prediction mechanisms were exploiting only horizontal direction. Therefore, interview differences were defined as horizontal disparity. It was possible to calculate a corresponding pixel in another view using this disparity. Current camera arrays are no more horizontal only but more in a 2D or even in a 3D arrangement. Calculating a corresponding pixel in a neighbouring view requires a more complex processing which must take into account respective camera parameters. To combat these issues and shortcomings additional information to characterize cameras such as distortion information should be provided. In one embodiment, a pair camera mode can be introduced to represent the matrix of coefficients to calculate pixel positions in respective views.

An MPEG-I program targeting the delivery of content (such as 6DoF content) can allow the end-user to move inside the content and to perceive parallax. The rendered content at the client side should be adapted in real time to head movements of the observer. To create this parallax, one should deliver not only the usual 2D content but also content corresponding to what is not viewed with the initial angle but could be viewed from a different one when the viewer moves his head. This content can be typically captured by a camera array, each camera seeing the scene from slightly different angles and different positions. The distance between cameras gives roughly the amount of parallax the system will be able to provide. The amount of data to transmit a multi-view content in such a case may be exhaustive. Furthermore, to be able to synthetize intermediate views to render correctly any viewing position, some depth maps must be transmitted associated with the texture. The MVD format has already been used in the past to deliver such content. It was for instance already used as input format for the 3D-HEVC extension of HEVC. In this standard, camera parameters were transmitted as SEI messages to be used at the decoder side.

In some instances, especially when renderings are volumetrically exhaustive, camera parameters are mandatory in order to precisely calculate corresponding positions of a given point in space in any of the input views. For example, in a 3D-HEVC, multi-view contents are only provided from horizontally aligned cameras and then they can be later rectified. This means that the different views were pre-processed in order to have their respective camera principal point on a same grid. This also means that for a given point in space, the distance between its position in two different views corresponding to two different cameras was a disparity expressed only in horizontal direction.

When multiple cameras are used that are not horizontally aligned, nor rectified without considering any pre-processing such as a distortion correction. Some kind of calibration may be desirous and camera parameters become important. Camera parameters that are needed include:
  Extrinsic parameters,
  Intrinsic parameters, and
  Distortion parameters Intrinsic parameters deal with the camera's internal characteristics, such as, its focal length, skew, distortion, and image center. Extrinsic parameters, on the other hand describe its position and orientation in the world. Knowing intrinsic parameters is an essential first step for 3D computer vision, as it allows you to estimate the scene's structure in Euclidean space and removes lens distortion, which degrades accuracy. In geometric optics, distortion is a deviation from rectilinear projection, a projection in which straight lines in a scene remain straight in an image. It is a form of optical aberration.

Figure 6:
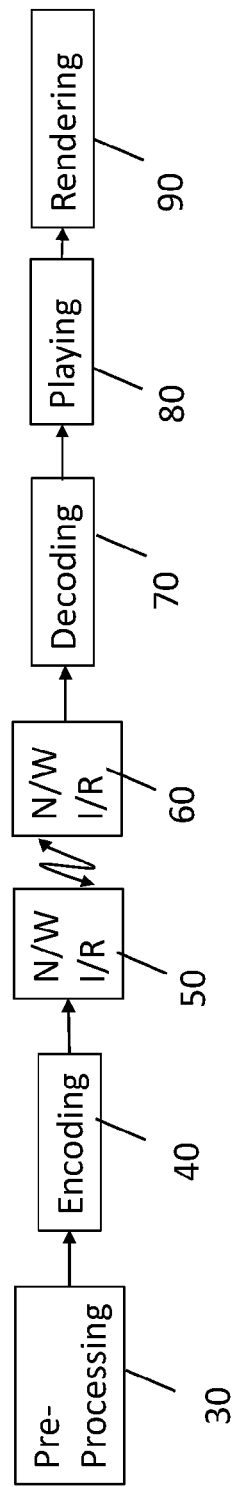
FIG. 6 is a schematic illustration of an encoding and decoding system according to one or more embodiments.

FIG. 6 schematically illustrates a general overview of an encoding and decoding system according to one or more embodiments. The system of FIG. 6 is configured to perform one or more functions. A pre-processing module 30 may be provided to prepare the content for encoding by an encoding device 40. The pre-processing module 30 may perform multi-image acquisition, merging of the acquired multiple images in a common space. Depending on the acquired video data representation, the pre-processing module 30 may perform a mapping space change. After being encoded, the data, which may be encoded immersive video data or 3D CGI may be typically implemented in any network interface, for instance present in a gateway. The data are then transmitted through a communication network, such as internet but any other network may be foreseen. Then the data are received via network interface 60 if appropriate. Network interface 60 may be implemented in a gateway, in a television, in a set-top box, in a head mounted display device, in an immersive (projective) wall or in any immersive video rendering device. After reception, the data are sent to a decoding device 700. Decoded data are then processed by component 80 which can be a player. Data is then prepared for a rendering device 90.

At the decoder side, the camera parameters are extracted from the stream and calculations are performed to calculate corresponding pixel positions in different views (for view prediction in the decoding process for instance). These calculations include matrix products and inverse matrix calculation which could be quite computationally intensive. In order to reduce the decoder complexity, it is possible to pre-compute these camera parameters at the encoder side and to transmit them in the bitstream in an improved manner, from a decoder perspective.

FIG. 1 provides an exemplary view of a multi view camera 100. In this example a 16-camera array 110 (on 4 cameras by 4 cameras basis represented as 110) is provided that can become associated with one or more depth map. In one embodiment, the depth map could be using an 8-bit representation of the depth but this is not mandatory and can vary in alternate embodiments. In addition, FIG. 1, however, is only provided as an example and other array arrangements with arrays that have more or less cameras members can be provided in alternate embodiments. In the example of FIG. 1 which includes the particular camera array, overlap between captured views is important which requires an important compression step. In FIGS. 2a and 2b, for ease of understanding a view of an image is shown in FIG. 2a and its associated depth map in FIG. 2b (referenced at 210 and 220).

FIG. 8 illustrates an associated table (Table1) that provides an illustration of a multi-view acquisition information. This Table provides SEI message syntax in HEVC. SEI messages describe the cameras intrinsic and extrinsic parameters. Currently, the parameters are needed by the decoder to precisely calculate corresponding positions of a given point in space in any of the views. Furthermore, the previous description does not include any distortion parameters associated to each camera. The model of camera described in the SEI message of HEVC is considering only undistorted camera. It is important to provide the opportunity to describe distortion parameters in order to consider any kind of content that could be undistorted or not.

Another limitation presented by the prior art is in the way camera parameters are described (G.14.2.6 section in HEVC standard) is the amount of calculation they require to be used. Each value of each rotation or translation matrix is given in a scientific notation. It corresponds to a sign (1 bit) an exponent (6 bit) and a mantissa (vbit). Intrinsic parameters (focal and skew and principal points) are also described using the same notation. This notation requires some calculations before being used at the decoder side. In alternative embodiment, it is possible to send in parallel 32 bits fixed point version of these parameters to simplify calculations at the decoder side.

In one embodiment, it may be possible to simplify calculations at the decoder side is to remove part of the calculations to be done when manipulating camera parameters. In one embodiment, as discussed later, this entire calculation can be performed in a very precise manner that correspondingly provides positions of a given point in space from one view to another one is presented. This allows extraction of information to convert one position corresponding to one camera to another position corresponding to another camera. In one embodiment, a pre-calculated matrix can be provided in order to simplify the amount of calculation needed, particularly on the decoder side.

In another embodiment, when camera parameters that have been associated to the acquisition of each view, techniques can be used that allow for the transmission of camera parameters that:
  integrate distortion parameters of cameras to ensure the use of any kind of content (undistorted or not)

Simplify the calculation load of the decoder by proposing pre-computed matrix product to address projection and deprojection of pixels from a group of two cameras; and Simplify the calculation of the distortion at the decoder side by proposing pre-computed warp map and unwarp map.

In addition, to ease understanding of the concepts that are presented a multi-view and depth format is provided in the input format for an encoder. (Multi-view+depth means for each views the RGB content is associated with a depth map at the same pixel resolution. This depth map may be generated by any means (calculation, measurement, etc.) as known by those skilled in the art. In one embodiment, to correctly exploit such content from multiple cameras, a calibration phase is required to determine relative position of cameras (extrinsic parameters) and individual camera parameters (intrinsic parameters) such as the focal length or the principal point position.

In one embodiment, this calibration phase is done before the shooting using specific test patterns and associated software. In order to understand the techniques developed and used in conjunction with some of the embodiments used herein, some background material regarding the compression of multi-view and depth content information needs to be explored. For this purpose, it is useful to explore an example that uses various views of different points in space and calculate corresponding pixels positions in different views for at least one of these points in space. In one embodiment, as shown in FIG. 3, for one pixel of one view associated camera position can be calculated so as to determine the corresponding position as if acquired by another camera for this point. In this example the position for this point is P(u,v) in camera c (referenced as 310) which also corresponds to the position P'(u',v') if acquired by camera c', as referenced at 320.

In this embodiment, the intrinsic and extrinsic parameters are used to allow for the calculation of P', given information relating to point P. Considering a camera calibrated as a plain pinhole. Let $$K = \begin{pmatrix} f & \gamma & c_u \\ 0 & \alpha f & c_v \\ 0 & 0 & 1 \end{pmatrix}$$

be its intrinsic matrix:
  f denotes the distance from the exit pupil to the sensor, expressed in pixels, and often abusively referred to as "focal length" in the literature;

$$\begin{pmatrix} c_u \\ c_v \end{pmatrix}$$

denotes the pixel coordinates of the so-called "principal point", i.e. the orthogonal projection of the pinhole onto the sensor;
  $\alpha$ and $\gamma$ respectively denote pixels' aspect ratio and the sensors skew coefficient.
In one embodiment, if $$\begin{pmatrix} x \\ y \\ z \end{pmatrix}$$

are the coordinates of a given point in the Coordinate System (CS) of the camera, the coordinates of its image projection $$\begin{pmatrix} u \\ v \end{pmatrix}$$

are given (in pixel) by:

$$\begin{pmatrix} u \\ v \\ 1 \end{pmatrix} \equiv K \cdot \begin{pmatrix} x \\ y \\ z \end{pmatrix}$$

Where the symbol ≡ denotes the equivalence relation between homogeneous vectors:

$$\begin{pmatrix} s \\ t \\ 1 \end{pmatrix} \equiv \begin{pmatrix} x \\ y \\ z \end{pmatrix} \Leftrightarrow \begin{cases} s = x/z \\ t = y/z \end{cases}$$

Let $P=(R\ T) \in \mathbb{R}_{3\times 4}$ denote the pose matrix of the camera, where $R \in \mathbb{R}_{3\times 3}$ and $T \in \mathbb{R}_{3\times 1}$ respectively denote the camera's orientation and position in a reference Coordinate System (CS). The camera's extrinsic matrix is defined by:

$$Q=(R^{-1}-R^{-1}\cdot T) \in \mathbb{R}_{3\times 4}$$

If $$X_{cam} = \begin{pmatrix} x_{cam} \\ y_{cam} \\ z_{cam} \end{pmatrix} \text{ and } X_{world} = \begin{pmatrix} x_{world} \\ y_{world} \\ z_{world} \end{pmatrix}$$

denote the coordinates of the same point respectively in the Camera CS and in the reference CS, then $$X_{cam} = Q \cdot \begin{pmatrix} X_{world} \\ 1 \end{pmatrix} \text{ and } X_{world} = P \cdot \begin{pmatrix} x_{cam} \\ 1 \end{pmatrix}.$$

This can be further understood by reviewing FIG. 4. In FIG. 4, camera coordinate system (410) is shown using transitional matrix during transitional matrix (420).

For a given camera and a current view, let $$\begin{pmatrix} u \\ v \end{pmatrix}$$

be its index. Let be the current pixel, and z be its presumed depth. The corresponding match in a reference view #c' is:

$$\begin{pmatrix} u' \\ v' \\ 1 \end{pmatrix} \equiv K_{c'} \cdot Q_{c'} \cdot \left( P_c \cdot \begin{pmatrix} z \cdot K_c^{-1} \cdot \begin{pmatrix} u \\ v \\ 1 \end{pmatrix} \\ 1 \end{pmatrix} \right) \quad (1)$$

Given these parameters and equation (1), it is possible to calculate corresponding pixels positions in different views for one point in space while transmitting per camera:

The matrix K (intrinsic parameters)
Matrix R and T (rotation and translation matrix)

$K^{-1}$ and $R^{-1}$ should be calculated at the decoder side to perform the equation (1). This is the state of the art, K, R and T are data transmitted as SEI messages (as described in G.14.2.6 section of the HEVC standard, as known to those skilled in the art).

Embodiment 1a: 2 by 2 Camera Parameters, Scientific Representation of Data

In order to precompute the projection of one pixel onto another view, instead of transmitting intrinsic and extrinsic matrix it is possible to transmit for each group of two cameras the required product of matrix corresponding to equation (1). Replacing P by P=(R T) and Q by Q=(R$^{-1}$–R$^{-1}$. T)

$$\begin{pmatrix} u' \\ v' \\ 1 \end{pmatrix} \equiv K_{c'} \cdot (R_{c'}^{-1} - R_{c'}^{-1} \cdot T_{c'}) \cdot \left( (R_c T_c) \cdot \begin{pmatrix} z \cdot K_c^{-1} \cdot \begin{pmatrix} u \\ v \\ 1 \end{pmatrix} \\ 1 \end{pmatrix} \right)$$

Calculating the right part of the equation $$\begin{pmatrix} u' \\ v' \\ 1 \end{pmatrix} \equiv K_{c'} \cdot (R_{c'}^{-1} - R_{c'}^{-1} \cdot T_{c'}) \cdot \begin{pmatrix} z \cdot R_c K_c^{-1} \cdot \begin{pmatrix} u \\ v \\ 1 \end{pmatrix} + T_c \\ 1 \end{pmatrix}$$

And then finally as $$\begin{pmatrix} u' \\ v' \\ 1 \end{pmatrix} \equiv K_{c'} \cdot R_{c'}^{-1} \cdot \left( z \cdot R_c \cdot K_c^{-1} \cdot \begin{pmatrix} u \\ v \\ 1 \end{pmatrix} + T_c - T_{c'} \right)$$

In terms of storage, the two-by-two camera parameters approach requires therefore only a 3×3 matrix $A_{cc'}$ and a 3×1 vector $B_{cc'}$ per camera pair:

$$\begin{pmatrix} u' \\ v' \\ 1 \end{pmatrix} \equiv z \cdot A_{cc'} \cdot \begin{pmatrix} u \\ v \\ 1 \end{pmatrix} + B_{cc'} \quad (2)$$

Where $$\begin{cases} A_{cc'} = K_{c'} \cdot R_{c'}^{-1} \cdot R_c \cdot K_c^{-1} \\ B_{cc'} = K_{c'} \cdot R_{c'}^{-1} \cdot (T_c - T_{c'}) \end{cases}$$

In theory any combination of camera pairs can be transmitted which mean n² set of information for n cameras. Nevertheless, in one embodiment, the prediction of the view to be decoded (using a view already decoded) in all the combinations are not required. Only a given number of camera pair are required following usual dependencies between encoded views. The number of pairs to be transmitted is more likely to be in the order on 2*n instead of n² "number_of_camera_pairs".

FIG. 9 provides a table (Table 2) according to one embodiment having a two-by-two camera parameters example. This table provides the scientific representation calculation and numbers. It should be noted that equation (2) as discussed also requires an implicit division by z to get these homogeneous coordinates. In order to simplify calculations made at the decoder side, this division can be approximated by a shift of a given number of bits (introducing a given rounding error). In this example, a/z is replaced by a/(floor(log 2(z))).

Embodiment 1b: Two-by-Two Camera Parameters, Fixed-Point Representation of Data

In this embodiment, which is also illustrated in FIG. 10's table (Table 3), instead of representing any value of both Acc' and Bcc' matrix in scientific representation, it is possible to present such information on a fixed-point representation. In this way, the components appearing in this table is modified to show the entries provided in this table. It should, however, be noted that for the rest of the document, for any of the remaining embodiments, parameters are described in scientific notation, it is possible to consider the specification of fixed-point representation of each of these parameters. Similar embodiment could then be proposed to address the same parameters but in a fixed-point representation.

Multi-View Contents Presenting Optical Distortion.

The previous description was based on undistorted content which means the original content from the camera have been modified in order to remove distortion brought by the optical system. Now consider content without correcting this distortion. The pinhole model fails to provide accurate correspondences, because of the geometric distortions occurring in actual optical systems. First, let $\overline{K}$ denote the first two lines of the intrinsic matrix. Let also $\overline{K^{-1}}$ denote the first two lines the inverse intrinsic matrix. Let $$\begin{pmatrix} x \\ y \\ z \end{pmatrix}$$

be a 3D point the CS of a given camera. Let's consider the corresponding homogeneous vector $$\begin{pmatrix} s \\ t \\ 1 \end{pmatrix} \equiv \begin{pmatrix} x \\ y \\ z \end{pmatrix}$$

Taking the optical distortions into account, the image projection equation becomes:

$$\begin{pmatrix} u \\ v \end{pmatrix} = \overline{K} \cdot \left( W \begin{pmatrix} s \\ t \end{pmatrix} \right)$$

$W: \mathbb{R}^2 \to \mathbb{R}^2$ denoting the forward warping operator induced by distortion. W is usually a polynomial and therefore defined by a set of coefficients in floating-point format: $\{a_k\}_{k \leq N}$ There is a variety of distortion models in the literature. E.g. Zhang only considers the first two terms of radial distortion (Z. Zhang, "A flexible new technique for camera calibration", in *IEEE Trans Pattern Analysis & Machine Intelligence*, vol. 22, no. 11, pp. 1330-1334, November 2000):

$$W \begin{pmatrix} s \\ t \end{pmatrix} = (1 + dr) \begin{pmatrix} s \\ t \end{pmatrix}$$

Where $dr = a_1 \cdot r^2 + a_2 \cdot r^4$, $r = \sqrt{s^2 + t^2}$ denoting the radius of the projection. On the other hand, in his popular Matlab toolbox (http://www.vision.caltech.edu/bougueti/calib_doc/), Bouguet uses a more sophisticated 5-coefficient model that considers as well tangential distortion and higher-order radial distortion:

$$W \begin{pmatrix} s \\ t \end{pmatrix} = (1 + dr) \begin{pmatrix} s \\ t \end{pmatrix} + \begin{pmatrix} ds \\ dt \end{pmatrix} \qquad (3)$$

Where $$\begin{cases} dr = a_1 \cdot r^2 + a_2 \cdot r^4 + a_5 \cdot r^6 \\ ds = 2a_3 \cdot s \cdot t + a_4 \cdot (r^2 + 2s^2) \\ dt = 2a_4 \cdot s \cdot t + a_3 \cdot (r^2 + 2t^2) \\ r = \sqrt{s^2 + t^2} \end{cases}$$

Inverting such polynomial models would lead to a rational fraction, which would induce pointless computational complexity. It is quite straightforward to approximate the undistortion (The wording "undistortion", meaning "inverse distortion", corresponds to the warping from the distorted rays (that end up onto the image sensor in the optical system) back to the undistorted rays in the object world) warping by a polynomial of the same degree.

Presently, several embodiments for distorted contents can now be explored. The first one requires polynomial computations but restricts the metadata to their most compact form. The subsequent improve the in-loop performances but requires the pre-computation of an undistortion warp map.

Embodiment 2: Distortion Parameters Featuring Polynomial Computations

In this embodiment, based on the model applied already, the number of parameters to described by the distortion can vary. The first information to transmit is the model applied (among a list of known models). The number of parameters is deduced from the model. Both the distortion and the undistortion information are sent to avoid calculating the undistortion coefficients at the decoding side. In term of syntax the transmission of such information is reflected in FIG. 11 (Table 4).

Embodiment 3: Distortion Parameters Featuring Polynomial Computations Combined with Two-by-Two Camera Parameters Representation When considering the distortion equation (1) becomes:

$$\boxed{\begin{pmatrix} u' \\ v' \end{pmatrix} = \overline{K_{c'}} \cdot W_{c'} \begin{pmatrix} s \\ t \end{pmatrix}} \qquad (4)$$

Where $$\begin{pmatrix} s \\ t \\ 1 \end{pmatrix} \equiv Q_{c'} \cdot \left( P_{c'} \cdot \left( z \cdot \begin{pmatrix} W_c \left( \overline{K_c^{-1}} \cdot \begin{pmatrix} u \\ v \end{pmatrix} \right) \\ 1 \\ 1 \end{pmatrix} \right) \right) \qquad (5)$$

And—looking back to rotation matrices and translation vectors:

$$\begin{pmatrix} s \\ t \\ 1 \end{pmatrix} \equiv R_{c'}^{-1} \cdot \left( R_c \cdot z \cdot \left( W_c^{-1} \left( \overline{K_c^{-1}} \cdot \begin{pmatrix} u \\ v \\ 1 \end{pmatrix} \right) \right) + T_c - T_{c'} \right)$$

Which can be reformulated as:

$$\boxed{\begin{pmatrix} s \\ t \\ 1 \end{pmatrix} \equiv z \cdot A_{cc'} \cdot \left( W_c^{-1} \left( \overline{K_c^{-1}} \cdot \begin{pmatrix} u \\ v \\ 1 \end{pmatrix} \right) \right) + B_{cc'}} \quad (6)$$

Where $$\boxed{\begin{cases} A_{cc'} = R_{c'}^{-1} \cdot R_c \\ B_{cc'} = R_{c'}^{-1} \cdot (T_c - T_{c'}) \end{cases}} \quad (7)$$

It should also be noted that because of the distortions, the math cannot be performed as a single linear algebra operation. In addition, This embodiment requires the storage of two polynomials $W_c$ and $W_c^{-1}$ and two 2×3 matrices $\overline{K_c}$ and $\overline{K_c^{-1}}$ per camera, in addition to the 3×3 matrix $A_{cc'}$ and the 3×1 vector $B_{cc'}$, per couple of cameras.

This is illustrated in FIG. 12, referenced as Table 5 (embodiment 3, distortion parameters combined with two-by-two camera pairs parameters, scientific representation).

Figure 5:
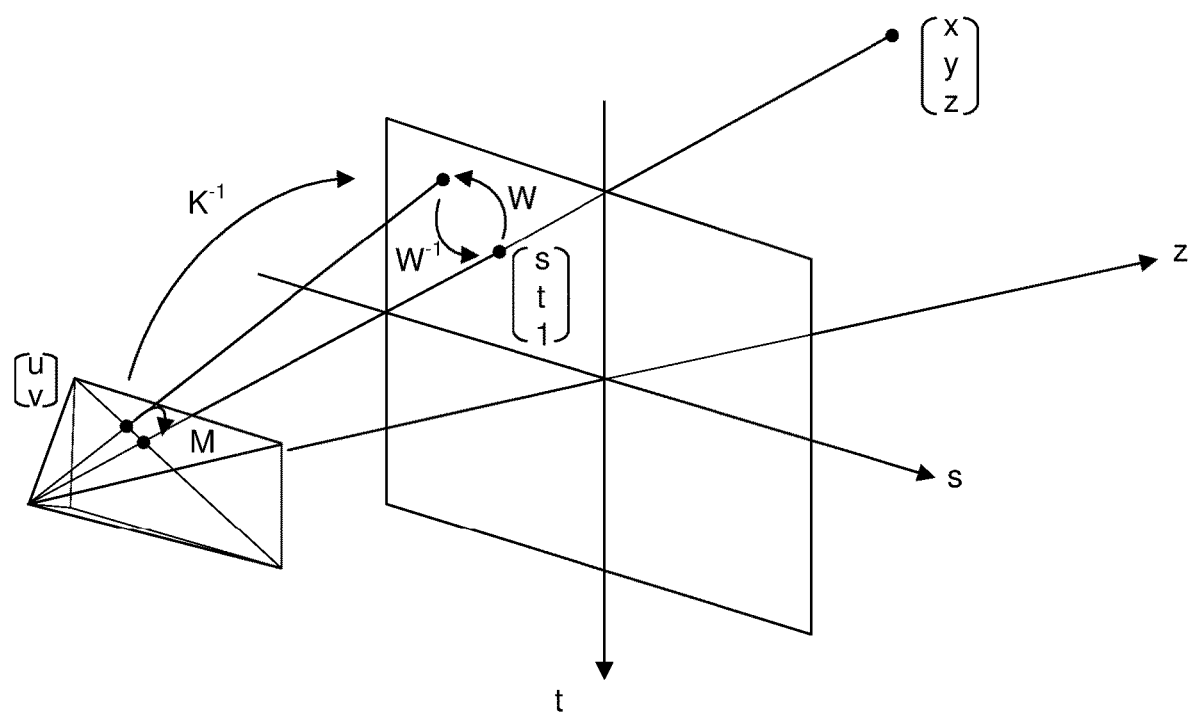
FIG. 5 is an illustration of a distorted content and associated distorted mapping.

Embodiment 4: Distorted Contents Using an Undistortion Warp Map Combined with Two-by-Two Camera Parameters Representation FIG. 5 is an illustration of a distorted content and associated distorted mapping. In the previous equation set, the polynomial computations $W_c^{-1}$ can be avoided by using the undistortion warp map $M_c^{undist}: \mathbb{N}^2 \to \mathbb{R}^2$ defined by:

$$M_c^{undist}[u, v] = \overline{K_c} \cdot W_c^{-1} \left( \overline{K_c^{-1}} \cdot \begin{pmatrix} u \\ v \end{pmatrix} \right)$$

The equation (5) becomes:

$$\begin{pmatrix} s \\ t \\ 1 \end{pmatrix} \equiv Q_{c'} \cdot \left( P_c \cdot \begin{pmatrix} z \cdot K_c^{-1} \cdot \begin{pmatrix} M_c^{undist}[u, v] \\ 1 \end{pmatrix} \\ 1 \end{pmatrix} \right)$$

Or equivalently:

$$\begin{pmatrix} s \\ t \\ 1 \end{pmatrix} \equiv R_{c'}^{-1} \cdot \left( R_c \cdot z \cdot K_c^{-1} \cdot \begin{pmatrix} M_c^{undist}[u, v] \\ 1 \end{pmatrix} + T_c - T_{c'} \right)$$

Which can be reformulated as:

$$\boxed{\begin{pmatrix} s \\ t \\ 1 \end{pmatrix} \equiv z \cdot A_{cc'} \cdot \begin{pmatrix} M_c^{undist}[u, v] \\ 1 \end{pmatrix} + B_{cc'}} \quad (9)$$

Where $$\boxed{\begin{cases} A_{cc'} = R_{c'}^{-1} \cdot R_c \cdot K_c^{-1} \\ B_{cc'} = R_{c'}^{-1} \cdot (T_c - T_{c'}) \end{cases}} \quad (10)$$

In terms of storage, this embodiment requires one polynomial $W_c$, one undistortion map $M_c^{undist}$ and one 2×3 matrix $\overline{K_c}$ (instead of two polynomials and two 2×3 matrices) per camera, plus the 3×3 matrix $A_{cc'}$, and the 3×1 vector $B_{cc'}$, per couple of cameras.

It should also be noted that the pre-computation of the undistortion warp map allows to save one half of the polynomial math. Warp maps may present a lower resolution than input images. In that case, warped positions are interpolated from pre-computed nodes. A subsampling factor can be applied in both horizontal and vertical direction in order to reduce the amount of information to transmit. This is illustrated further in FIG. 13 as referenced under Table 6.

Figure 13:
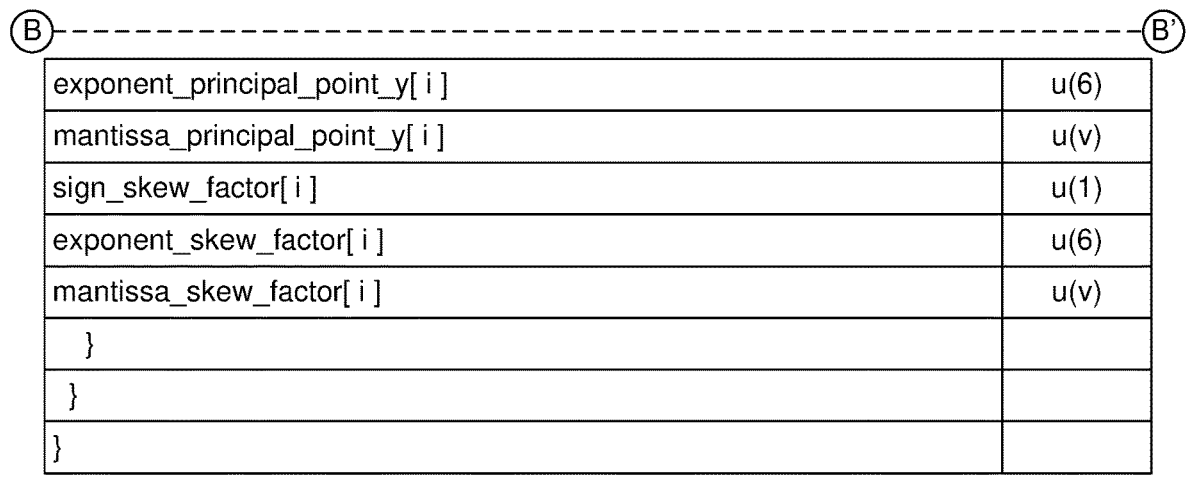
FIG. 13 is yet another table providing undistortion warp map combined with two-by-two camera parameters according to one embodiment.

In another embodiment, instead of defining a subsampling factor for the unwarp map (Subsampling_factor_X and Subsampling_factor_Y), the size in horizontal and in vertical of the undistortion map is directly transmitted. FIG. 13's Table 6 is then modified as shown in FIG. 14, as referenced as Table 7. It should also be noted that similar embodiment can be proposed for the embodiment 5 by replacing the subsampling factor by the size of the maps (for both undistortion and distortion maps).

Embodiment 5: Distorted Contents Using a Distortion Warp Map and an Undistortion Warp Map Combined with Two-by-Two Camera Parameters Representation Warp maps can also be used to avoid the remaining polynomial math by defining $M_c^{dist}: \mathbb{N}^2 \to \mathbb{R}^2$ as follows:

$$M_c^{dist}[u, v] = \overline{K_c} \cdot W_c(\overline{K_c^{-1}} \cdot \begin{pmatrix} u \\ v \end{pmatrix})$$

In this case the equation (4) becomes:

$$\boxed{\begin{pmatrix} u' \\ v' \end{pmatrix} = M_{c'}^{dist}[u'_{undist}, v'_{undist}]} \quad (11)$$

Where $$\begin{pmatrix} u'_{undist} \\ v'_{undist} \\ 1 \end{pmatrix} \equiv K_{c'} \cdot Q_{c'} \cdot \left( P_c \cdot \begin{pmatrix} z \cdot K_c^{-1} \cdot \begin{pmatrix} M_c^{undist}[u, v] \\ 1 \end{pmatrix} \\ 1 \end{pmatrix} \right)$$

Or equivalently:

$$\begin{pmatrix} u'_{undist} \\ v'_{undist} \\ 1 \end{pmatrix} \equiv K_{c'} \cdot R_{c'}^{-1} \cdot \left( R_c \cdot z \cdot K_c^{-1} \cdot \begin{pmatrix} M_c^{undist}[u, v] \\ 1 \end{pmatrix} + T_c - T_{c'} \right)$$

Which can be reformulated as:

$$\boxed{\begin{pmatrix} u'_{undist} \\ v'_{undist} \\ 1 \end{pmatrix} \equiv z \cdot A_{cc'} \cdot \begin{pmatrix} M_c^{undist}[u, v] \\ 1 \end{pmatrix} + B_{cc'}} \quad (12)$$

Where $$\boxed{\begin{cases} A_{cc'} = K_{c'} \cdot R_{c'}^{-1} \cdot R_c \cdot K_c^{-1} \\ B_{cc'} = K_{c'} \cdot R_{c'}^{-1} \cdot (T_c - T_{c'}) \end{cases}} \quad (13)$$

Figure 15:
FIG. 15 provides a table according to one embodiment having two warp maps.

In terms of transmission, this embodiment requires two warp maps $M_c^{dist}$ and $M_c^{undist}$ per camera, in addition to the 3×3 matrix $A_{cc'}$, and to the 1×3 vector $B_{cc'}$, per couple of cameras. This is captured in FIG. 15, Table 8.

Figure 7:
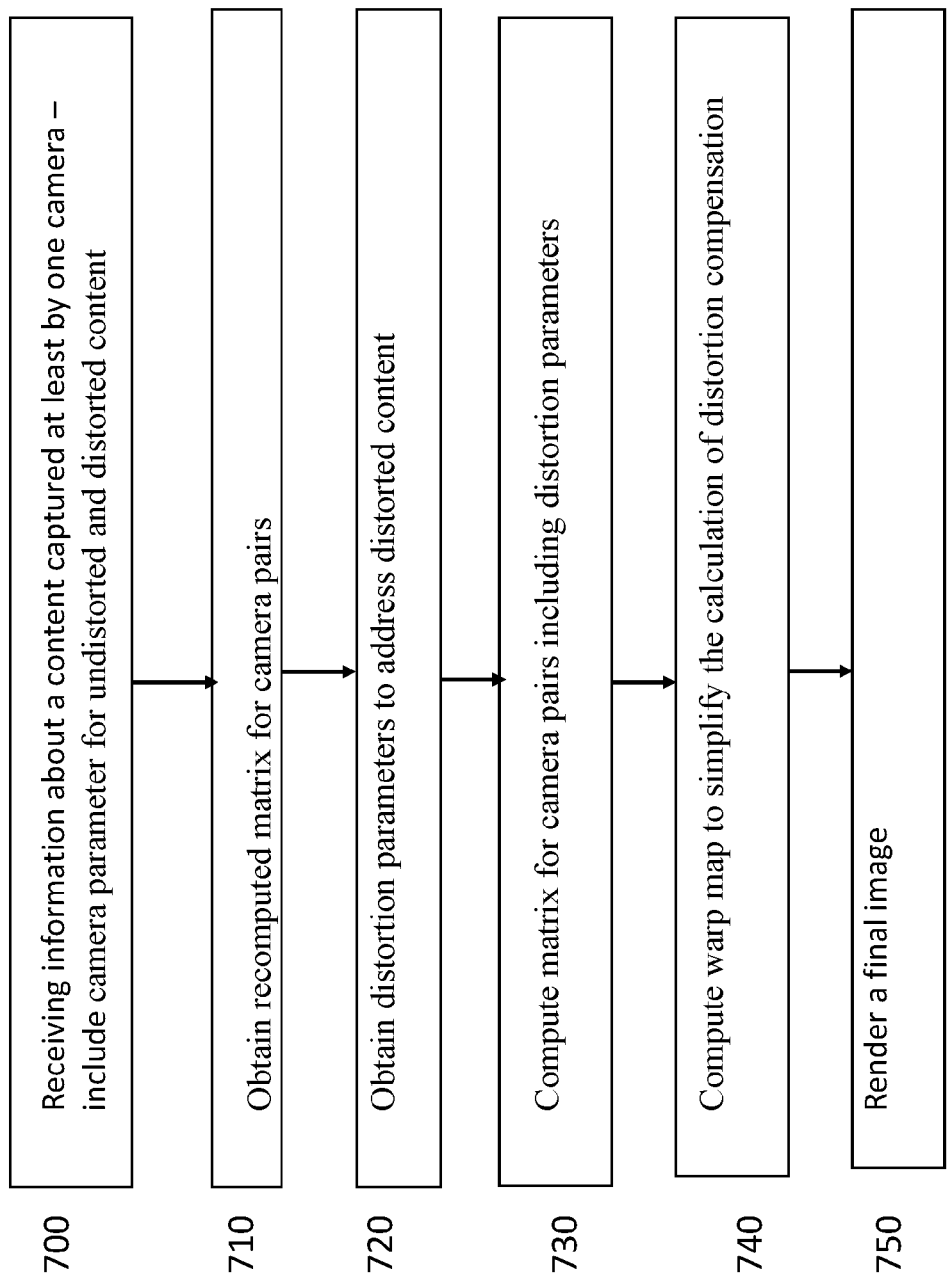
FIG. 7 is a flow diagram of a methodology according to one embodiment.

FIG. 7 is a flowchart illustration of one embodiment. In FIG. 7, at step 700 information is received such as from a processor about a content captured at least by one camera. It is possible that multiple cameras will be used and the content contains multiple images or the same image from multiple angles. The information received, in one embodiment, includes camera parameters for undistorted and distorted rendering of the content as shown in 710. The matrix then is computed for the camera in step 720. In step 730, distortion parameters are obtained to address distorted content. In step 740 computation is made for the matrix for camera pairs including distortion parameters. In step 750 warp map is computed to simplify the calculation of distortion compensation and a final image is then rendered in step 760.

The invention claimed is:

1. A method comprising:
   receiving information about a content image captured by at least one pair of cameras, said content image including a multi-view representation of an image including both distorted and undistorted content;
   obtaining, at least one of a camera parameter and an image parameter;
   obtaining, using said at least one of the camera parameter and the image parameter, distortion information indicating which content is undistorted and which content is distorted in said multi-view representation;
   calculating a depth map of said image using said distortion information; and
   rendering a final stereoscopic image that uses said distortion information and said depth map.

2. The method of claim 1, wherein said at least one of the camera parameter and the image parameter is used to provide a matrix for the at least one pair of cameras.

3. The method of claim 2, wherein said matrix for the at least one pair of cameras includes distortion parameters.

4. The method of claim 2, wherein said matrix for at least one pair of cameras is used to determine a warp map.

5. The method of claim 4, wherein said warp map is further defined as a refinement of a motion vector.

6. The method of claim 5, wherein said warp map is associated with a prediction mode.

7. The method of claim 1, wherein said distortion information is provided to obtain a distorted content.

8. The method of claim 1, wherein said distortion information is provided to obtain an address for a distorted content.

9. The method of claim 1, wherein said distortion information is used to provide a distortion compensation value to calculate a warp map.

10. A non-transitory processor readable medium having stored therein instructions for causing a processor to perform the method according to claim 1.

11. A non-transitory storage medium carrying instructions of program code for executing the method of claim 1.

12. An apparatus comprising one or more processors configured for:
    receiving information about a content image captured by at least one pair of cameras, said content image including a multi-view representation of an image including both distorted and undistorted content;
    obtaining at least one of a camera parameter and an image parameter;
    obtaining, using said at least one of the camera parameter and the image parameter, distortion information indicating which content is undistorted and which content is distorted in said multi-view representation;
    calculating a depth map of said image using said distortion information; and
    rendering a final stereoscopic image that uses said distortion information and said depth map.

13. The apparatus of claim 12, wherein said at least one of the camera parameter and the image parameter is used to provide a matrix for the at least one pair of cameras.

14. The apparatus of claim 13, wherein said matrix for the at least one pair of cameras includes distortion parameters.

15. The apparatus of claim 13, wherein said matrix for the at least one pair of cameras is used to determine a warp map.

16. The apparatus of claim 15, wherein said warp map is further defined as a refinement of a motion vector.

17. The apparatus of claim 16, wherein said warp map is associated with a prediction mode.

18. The apparatus according to claim 12, wherein said distortion information is provided to obtain a distorted content.

19. The apparatus of claim 12, wherein said distortion information is provided to obtain an address for a distorted content.

20. The apparatus of claim 12, wherein said distortion information is used to provide a distortion compensation value to calculate a warp map.

* * * * *